(12) United States Patent
Hancsarik et al.

(10) Patent No.: US 8,484,156 B2
(45) Date of Patent: *Jul. 9, 2013

(54) METHOD AND DATA STRUCTURE FOR EXCHANGING DATA

(75) Inventors: Robert M. Hancsarik, Johnston, RI (US); Douglas E. Humphrey, Milton, MA (US)

(73) Assignee: Invensys Systems, Inc., Foxboro, MA (US)

( * ) Notice: Subject to any disclaimer, the term of this patent is extended or adjusted under 35 U.S.C. 154(b) by 426 days.

This patent is subject to a terminal disclaimer.

(21) Appl. No.: 12/637,186

(22) Filed: Dec. 14, 2009

(65) Prior Publication Data

US 2010/0091799 A1    Apr. 15, 2010

Related U.S. Application Data

(63) Continuation of application No. 10/403,687, filed on Mar. 31, 2003, now Pat. No. 7,657,573.

(51) Int. Cl.
*G06F 17/00* (2006.01)
*G06F 15/16* (2006.01)
*G06F 13/00* (2006.01)

(52) U.S. Cl.
USPC .......... 707/602; 715/234; 715/243; 709/231; 709/232; 719/328

(58) Field of Classification Search
None
See application file for complete search history.

(56) References Cited

U.S. PATENT DOCUMENTS 6,151,602 A * 11/2000 Hejlsberg et al. ................... 1/1

* cited by examiner

*Primary Examiner* — H S Sough
*Assistant Examiner* — Phuong Hoang
(74) *Attorney, Agent, or Firm* — Edward S. Jarmolowicz (57) ABSTRACT

A method and system for exchanging at least one data value between a first device and at least one second device, including providing at least one data structure at the first device, the data structure including at least one descriptive field and an associated at least one data value field, the at least one data value field including the least one data value, the at least one descriptive field including a usage type field having usage type data to associate the at least one data value field with a data type, transmitting the at least one data structure from the first device to the at least one second device, and, based on at least the usage type data, at the at least one second device, extracting the at least one data value from the at least one data value field.

3 Claims, 5 Drawing Sheets

METHOD AND DATA STRUCTURE FOR EXCHANGING DATA

CLAIM OF PRIORITY

This application is a continuation of U.S. application Ser. No. 10/403,687, filed Mar. 31, 2003, hereby incorporated herein by reference.

FIELD

The disclosed methods and data structures relate to data transfer, and more particularly to data transmission between processors that may use separate address space.

BACKGROUND

In efforts to increase efficiencies, commercial and industrial process control may have become increasingly automated. A wide variety of sensors, actuators and other process monitoring and/or control devices may monitor and adjust the commercial and/or industrial process through one or more processors of the process system. For example, the sensors may monitor operating parameters for the process, or may evaluate process flow and may provide feedback data regarding the monitored parameters or process status. The feedback data may be provided to one or more of the processors, which may then store and use the data to generate system control signals that one or more actuators may use to adjust the process. To communicate with the process control devices, the processors may typically operate by an operating system, such as Windows NT, Solaris, OSE, or other known operating system, which enables the processor to communicate with the process control devices.

Commercially available software may also be employed to interface the process control devices with the operating system of the processors of the process control system. Such software may not directly integrate with some of the processor operating systems and thus may have to be customized for operation with the processor operating system by an experienced programmer. As an example, customization of process control device software designed to operate in a Windows NT environment, which can employ a machine architecture that orders bytes of data values in memory from least to most significant, may be required such that the process control device may communicate with the process control system that may be operating in a Solaris or OSE environment, where the bytes of data values can be ordered from most to least significant. Additionally, system upgrades, maintenance and/or process control device changes may require reprogramming. Thus, the added costs associated with providing compatible processors and process control devices may substantially increase installation, operation, maintenance and upgrade costs for the automated process control system.

Data values may be sent between the processors and the applications and/or between the processors themselves. Thus, it may be necessary to ensure that data structures are compatible among the processors and/or process control devices. A mechanism to provide flexibility for applications to build and interpret data structures, such that the data values that may be contained within the data structures may be exchanged between processors and/or process control devices may reduce the costs for providing compatibility between processors and/or process control devices.

SUMMARY

The disclosed methods and systems include a method of exchanging at least one data value between a first device and at least one second device, which include providing at least one data structure at the first device, the data structure including at least one descriptive field and an associated at least one data value field, the at least one data value field including the least one data value, the at least one descriptive field including a usage type field having usage type data to associate the at least one data value field with a data type, transmitting the at least one data structure from the first device to the at least one second device, and, based on at least the usage type data, at the at least one second device, extracting the at least one data value from the at least one data value field. The at least one data structure can include at least one header data structure and at least one non-header data structure, the at least one header data structure specifying a machine architecture associated with the first device.

The data structure(s) can include a value record, the at least one header data structure can be a header container, and the at least one non-header data structure can be at least one of: a single container, a double container, a bytegroup container, a string container, an array container, and a structured data container.

The data structure(s) can include a data structure version type field, a template field, and/or a template identification field, where such fields can be part of the descriptive fields. The descriptive field(s) can include a pointer to at least one second data structure, the at least one second data structure including a descriptive field(s) and an associated data value field(s). Accordingly, extracting the data value(s) from the data structure(s) can include identifying a pointer to a second data structure(s), and, based on the pointer and a descriptive field(s) in the data structure(s), extracting the data value(s) from the data value field(s). Extracting can thus include iteratively identifying a pointer until the pointer value is NULL.

The disclosed methods and systems thus allow for an exchange of data values when the first device and at least one of the at least one second device have a different architecture. Different architecture can include processor architecture. Accordingly, as provided herein, fields can include a memory element or part thereof, and a data structure can be comprised of one or more memory elements and/or fields. As provided herein, a data structure can include one or more data fields that include data to be transmitted, and one or more descriptive fields to describe or otherwise be associated with the data to be transmitted. The disclosed methods and systems can accordingly allow for a data structure that includes at least two data structure(s) that can have different usage type data, where usage type data can be: a signed short integer type, a signed long integer type, a character type, a signed real number type, an unsigned short integer type, an unsigned long integer type, a boolean type, an unsigned character type, a 64-bit real number type, a string type, and/or an undetermined type.

In one embodiment, the methods and systems include determining from the descriptive field(s) that the data structure(s) is a template, and, based on whether the data structure(s) is a template, identifying a template identifier from the descriptive field(s), and, storing the template with the template identifier. The methods and system also include determining from the descriptive field(s) that the data structure(s) includes a data-only data structure(s), and, based on the determination, identifying a template identifier from the at least one descriptive field, retrieving a template associated with the template identifier, and extracting the data value(s) from the data structure(s) based at least on the template. The methods and systems can allow the template to be stored, retrieved, and/or accessed via a wired and/or wireless network, and/or the template can reside locally. When a data value(s) is extracted based on a template, the data value(s) can be extracted based on at least one descriptive field of the retrieved template.

The methods and systems can facilitate methods and systems where the first device may use a first address space, and the second device(s) may use a second address space(s).

The disclosed methods and systems also include a method of exchanging data between a first device and at least one second device, including defining a data structure having at least one descriptive field and the data, where at least one descriptive field indicates the data structure is at least one of: a template structure, a data-only structure, and a complete structure; based on whether the data structure is a template structure and a data-only structure, providing at least one descriptive field to identify a template identification; providing at least one descriptive field to identify a data structure type; based on at least one of the template identification and the data structure type, assembling the at least one data structure; transmitting the at least one assembled data structure between the first device and the at least one second device; and, at the at least one second device, extracting the data based on at least one of whether the data structure is a template structure, a data-only structure, and a complete structure, and, the data structure type.

The method and systems include extracting the template identification as the data when the data structure is a template structure and/or a data-only structure. In an embodiment, based on the data structure being a template structure, extracting the data can include storing the template and a template identification associated with the template structure. Accordingly, based on the data structure being a data-only structure, extracting can include retrieving a template based on a template identification, and based on the retrieved template and the descriptive fields in the retrieved template, extracting the data from the data-only structure.

In the disclosed methods and systems, extracting the data from the data structure(s) can include extracting based on a descriptive field associated with an architecture of the first device. Extracting can also be based on a descriptive field associated with a data type of the data structure(s).

As provided herein, records and containers can be understood to be data structures.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore features, components, modules, and/or aspects of the illustrations can be otherwise combined, separated, interchanged, and/or rearranged without departing from the disclosed systems or methods. Additionally, the shapes and sizes of components are also exemplary, unless otherwise provided, and can be altered without affecting the disclosed systems or methods.

Figure 1A:
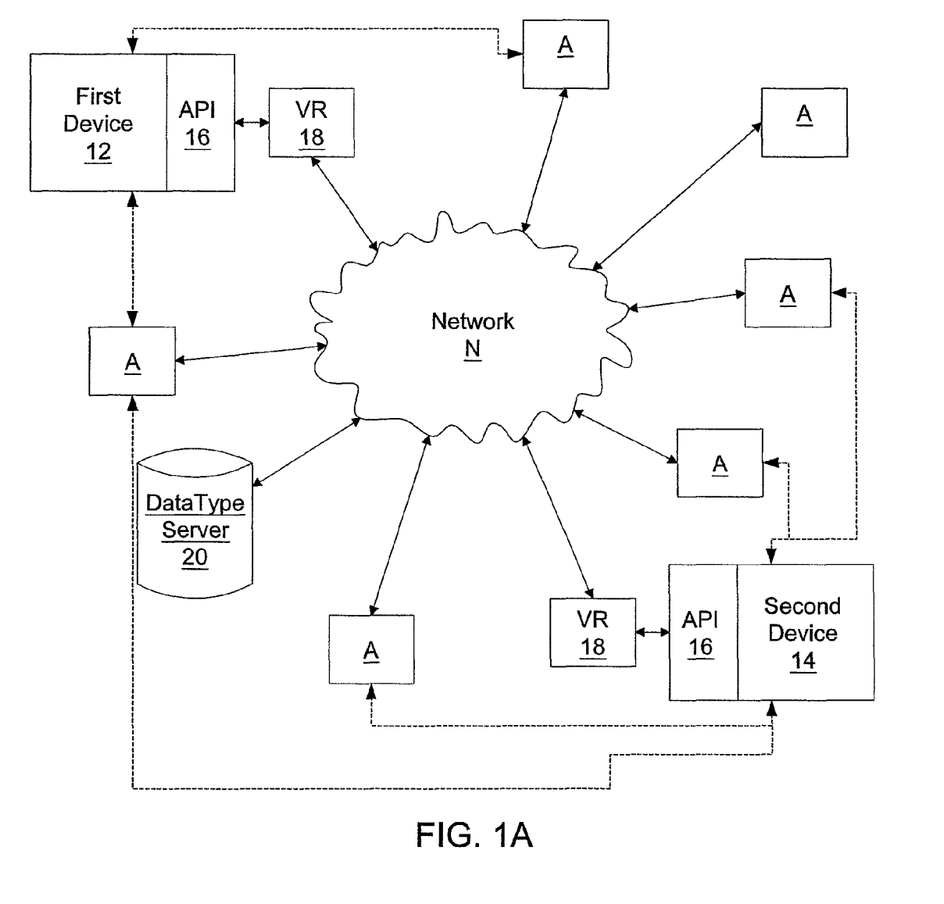
FIG. 1A illustrates one embodiment of a network having communications between a first device and a second device via a network.

FIG. 1A illustrates one embodiment where a first device 12 and a second device 14 communicate via a network N. The first device 12 can include a control processor that may control a manufacturing, industrial, commercial, or other process. As provided herein, first and second devices 12, 14 can be understood to be processor/microprocessor controlled devices. Those of ordinary skill in the art will recognize that the methods and systems disclosed herein are not limited to configurations having merely two such devices, and accordingly, two or more such devices can communicate as illustrated in FIG. 1A.

With reference to the FIG. 1A embodiment, the second device 14 can be a process control device that can monitor or adjust the process controlled by first device 12. The second device 14 can also include a processor that may control a part of the process controlled by the first device 12, or a related or separate process. Generally, data signals between the first and second devices 12, 14 may affect the control of the process. It can be understood that the first and second devices 12, 14 may also be connected to other devices, shown generally as devices A, with which they may exchange data signals over the network N.

Figure 1B:
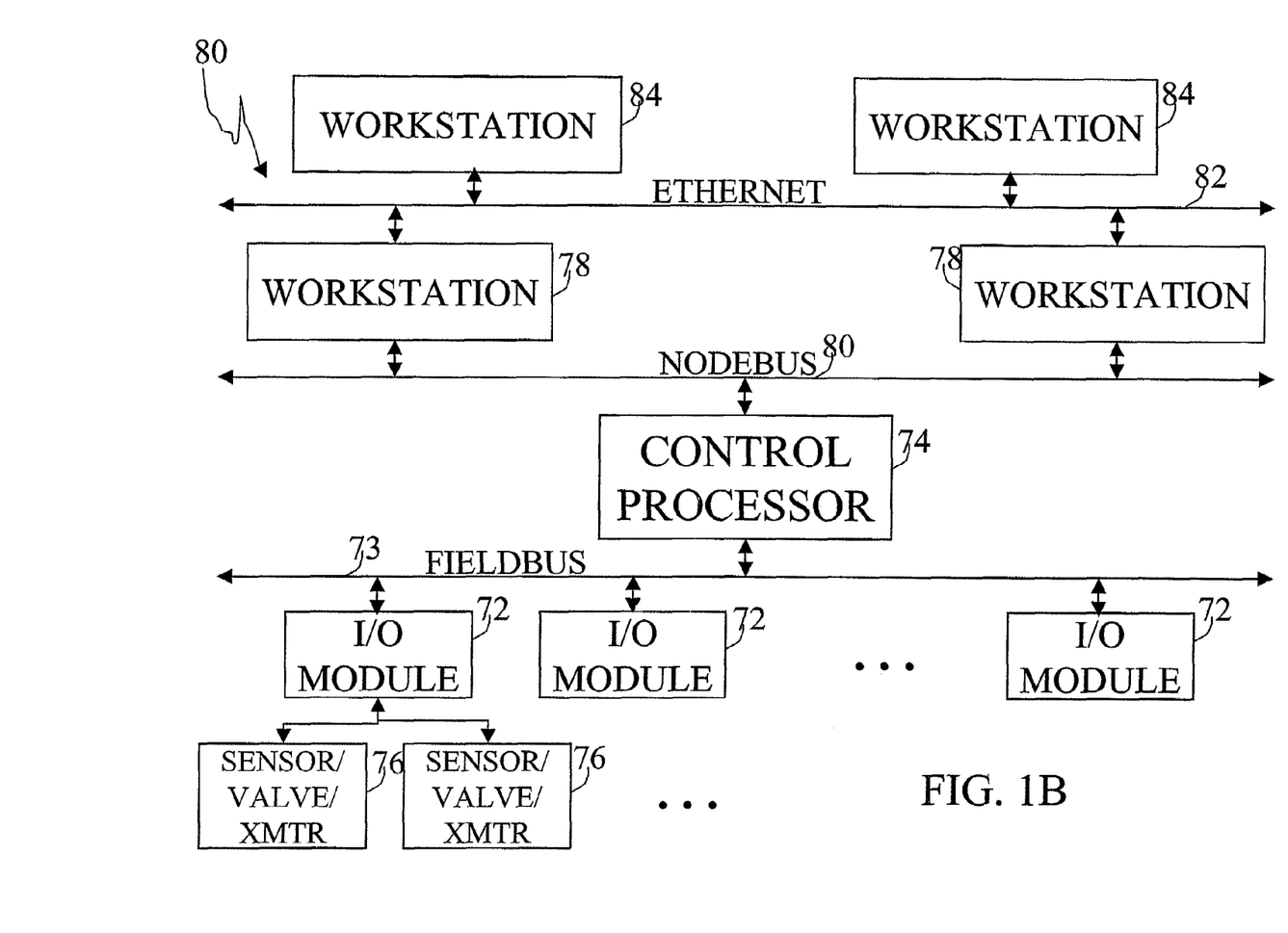
FIG. 1B illustrates an embodiment using a Fieldbus, Nodebus, and/or Ethernet protocols and/or networks.

With continued reference to FIGS. 1A and 1B, the network N can be one or more networks and/or network connections that can include one or more wired and/or wireless networks, intranets, the internet, and others. Accordingly, the network can include, for example, a network that can be implemented using Fieldbus, Nodebus, and/or Ethernet communications protocols, although other wired and/or wireless communications protocols and/or standards can be implemented without departing from the scope of the disclosed methods and systems.

With reference to FIG. 1B, the first device and/or second device can include, for example, one or more of the workstations 78, 84, control processor(s) 74, and/or I/O modules 72. As provided previously herein, for example, the illustrated control processor(s) 74 may communicate one or more VRs 18 to, for example, the I/O module(s) 72 and/or one or more of the workstations 78, 82 in such a way as to allow the transfer of data to be irrespective of the application running on the receiving device and/or the processor/machine type of the receiving device. For a network such as provided in FIG. 1B, accordingly, one or more of the workstations 84 can be replaced with a different machine type, etc., and the disclosed methods and systems can facilitate or otherwise allow the illustrated control processor 64 to continue communications with such replacement without otherwise requiring the control processor 64 to reformat the VR data structure.

The FIG. 1B system can be representative of an I/A Series® system from Invensys Systems, Inc. The I/A Series® system can includes the illustrated I/O Modules 72 such as FBM44 modules, wherein the I/O Modules 72 can interface to a Fieldbus 73 and hence to a Control Processor 74 such as the I/A Series® CP40B. Data from sensors 76 can be transferred to the I/O modules 72 using a transmitter, wherein the I/O Modules 72 can convert the sensor data to the Control Processor 74. In one embodiment of the system, the Control Processor 74 can include at least one processor that includes instructions for causing the processor to implement control algorithms. The Control Processor 74 can interface to Workstations 78 through an I/A Series Nodebus 80 that can be compatible with Ethernet. The Workstations can be, for example, the VA Series system AW51E that or another system. The Workstations 78 can have access to one or more internal or external databases, and can allow for the display of data to allow a processor engineer, manufacturing personnel, etc., to monitor and/or affect the controlled systems. The illustrated Workstations 78 can further interface to another Ethernet 82 that provides an interface to, for example, a corporate network that can be equipped with other Workstations 84, Personal Computers (PCs), etc., that can also have instructions for causing the display/control to management or other entities.

Returning to the Control Processor 74, the Control Processor 74 can be equipped to transfer control data to, for example, the valves or sensors 76 via the I/O Modules 72 to achieve specified control objectives. In one embodiment, the control objectives can be pre-programmed using a multivariable control system such as the Connisseur system provided by Invensys Systems, Inc., however in other embodiments, manufacturing or other process system adjustments can be made manually or through the I/A Series Workstations 78. Accordingly, as indicated herein, the disclosed methods and systems can be applied to a system such as systems according to FIG. 1B, where the various system elements may use different processors, different operating systems, different architectures, etc., and further, can be individually updated without respect for other system components.

As previously noted, the operating systems and/or data structures of first and second devices 12, 14 may not be compatible. To provide a common format for the exchange of data between first and second devices 12, 14, an Application Programming Interface (API) 16 may be provided to build and interpret data structures known herein as Value Records (VR's). For the illustrative diagram of FIG. 1, first device 12 can initiate API 16 to build a VR 18 for the data it wishes to exchange with second device 14. The second device 14 can then optionally use the API 16 to interpret the VR 18. Those of ordinary skill will understand that some embodiments may not employ the API 16, but may otherwise be configured with instructions for building and/or interpreting a VR.

A VR 18 can thus include one or more data elements with information and/or other data that can be used to identify, describe, and/or otherwise organize the data element(s). As will provided herein, in some embodiments, the data used to identify, describe, etc., may be provided by another VR 18 (e.g., template).

A VR 18 as described herein can include one or more data structures known herein as containers that can be associated with data values or groups of values. A VR 18 can include data of various types that may be exchanged between devices, such as the first and second devices 12, 14, for various device architectures. A VR 18 can include status and other information that can describe the data value or group of values. A VR 18 may be constructed to be "self-describing" in that it can include the information needed by a receiving device (e.g., 12, 14) to unpack and understand and/or otherwise interpret the VR contents using the API 16. The VR 18 may be constructed by associating one or more data containers.

For the disclosed methods and systems, the first and second devices (e.g., 12, 14) between which VRs are transmitted may use separate address spaces. Accordingly, the VR can include a self-referencing scheme that can employ an offset and a size for pieces of data within the VR. Unlike other data structures, a VR may not include an address pointer that could be invalid when copied to a different address space.

A VR 18 can include a 'header' container. A header container can include data to identify the VR to a receiving device. One or more additional containers can be appended to the header container for the data signals that can include data values or additional data, such as structured data, array data and/or strings. The header container may thus include data and/or information that can describe general characteristics of VR 18, such as its overall size, the source (e.g. processor) architecture used while constructing the VR 18, etc. A VR 18 size may not exceed a maximum integer value for the device architecture where the VR 18 and API 16 may be implemented. As an illustration, for the exemplary 32-bit implementation described herein, the size limit may be the maximum value that can be held in a 32-bit unsigned integer, or about 4.29 gigabytes. It will be understood that other implementations for other device architectures may have other size limits.

Table 1 shows one example of a header container with illustrative data format sizes, although those of ordinary skill will recognize such sizes and data items to be illustrative of one embodiment, and other embodiments can use other formats and fewer and/or more data items and/or with different data item names.

TABLE 1

Exemplary Header Container

| Data Item Name | Data Item Format | Exemplary Usage/Meaning |
|---|---|---|
| Allocated size | 32 bit unsigned integer | VR size (in bytes) |
| Container type | Bits 0-3 of a packed 8-bit unsigned integer | Type of container (e.g., header) |
| Is_template | Bit 4 of a packed 8-bit unsigned integer | Binary value to indicate whether this VR is a template. |
|  | Bits 5-7 of a packed 8-bit unsigned integer | The remaining bits of the 8-bit value. Available for custom uses. |
| Memory style | Bits 0-3 of a packed 8-bit unsigned integer | Indicates a memory allocation scheme. |
| Machine_architecture | Bits 4-7 of a packed 8-bit unsigned integer | Indicates an architecture or machine type corresponding to the |

TABLE 1-continued

Exemplary Header Container

| Data Item Name | Data Item Format | Exemplary Usage/Meaning |
|---|---|---|
| | | processor on which this VR was built. |
| Version | 8-bit unsigned integer | Indicates the availability of fields, (e.g., such that a version of VR can be backward-compatible.) |
| Pad1 | 8-bit unsigned integer | Can allow for proper byte alignment. Available for future use. |
| Required_size | 32 bit unsigned integer | Number of bytes in use in this VR (i.e., less than or equal to allocated_size). |
| Template_id | 32 bit unsigned integer | Identifier number if this is a template VR or a corresponding template exists for this 'complete' VR, otherwise zero. |
| Data_only_size | 32 bit unsigned integer | Size of a 'data-only' container that corresponds to the 'complete' and 'template' versions of this VR. Zero if this VR has no template. |

Other containers can be appended to the header container, including generic containers, string containers, array containers, and structured data containers. A generic container can include data of some number of contiguous bytes, and can be a 'parent' container type to create container sub-types. Some illustrative sub-types can include 'single' containers (e.g., four bytes), 'double' containers (e.g., eight bytes), and 'bytegroup' containers (e.g., length in bytes as specified when the bytegroup container may be created). While single and double containers can be of fixed size, a bytegroup container may be limited by the 'parent' VR size. Table 2 includes one illustration of a generic container. Table 2, like Table 1 and other Tables herein, is illustrative to show one container for one embodiment, and fewer container elements can be used, and/or more container elements (e.g., data items) can be used, with the data item formats being provided for illustration and not limitation.

TABLE 2

Exemplary Generic Container

| Data Item Name | Data Item Format | Usage |
|---|---|---|
| Size | 32 bit unsigned integer | Size of the container. In one example, the size can be "n" plus 10 bytes, where n is the size allocated for the contents of the 'Value' field |
| Container type | 8 bit unsigned integer | Examples for the embodiment described herein can include "single", "double", or "bytegroup." |
| Usage type | 8 bit unsigned integer | The data type of the value |
| Next | 32 bit unsigned integer | Offset to the next data container packaged as part of the VR 18. When this container is the last data container added to the VR 18, this value can be zero in one embodiment. |

TABLE 2-continued

Exemplary Generic Container

| Data Item Name | Data Item Format | Usage |
|---|---|---|
| Value | 'Size' less the 10 bytes defined for the above fields | Contains the value data |

The value field can have an associated 'usage type' field that can be used to identify the data type of the value data item. For instance, a single character placed into the value field of a VR as a 32-bit unsigned integer may be given a corresponding usage type, or data type (e.g., a 32-bit signed integer, a 32-bit unsigned integer, a 32-bit real value, a 64-bit real, etc.) that can indicate a 32-bit unsigned integer. Accordingly, when building a VR 18, the data type and/or usage type can be implicit and the user can be responsible for ensuring that the data value entered into the VR 18 corresponds to the data type that maps to the usage type.

A string container can include one NULL-terminated character string. The string container size, given by the number of characters in the string, can be specified at the time the container is added to the VR 18. The structure of the string container can be similar to that of the generic 'bytegroup' container, where the length varies per container, based on the string contained in the Value data item. A string container size generally cannot exceed its 'parent' VR size. Table 3 shows one illustrative structure for a string container:

TABLE 3

Exemplary 'string' Container

| Data Item Name | Data Item Format | Usage |
|---|---|---|
| Size | 32 bit unsigned integer | Size of container in bytes |
| Container type | 8 bit unsigned integer | E.g., "string" |

TABLE 3-continued

Exemplary 'string' Container

| Data Item Name | Data Item Format | Usage |
| --- | --- | --- |
| Usage type | 8 bit unsigned integer | Contains data type 'string' |
| Next | 32 bit unsigned integer | Offset to the next data container packaged as part of the VR 18. When this container is be the last data container added to the VR 18, this value may be zero. |
| Value | length in bytes varies per container | Contains the actual string data, including the NULL terminator. |

An array container can include an indexed group, or array of one or more data items, with members of the array being of the same usage type. The size of the items in a group can be, for example, 32- or 64-bits, except for a group of strings, which can be of varying lengths. The array container structure can be similar to that of the generic container, except that an unsigned integer data item "count" may be added to indicate how many data members may be in the array. An array container size may not exceed that of its 'parent' VR. Table 4 shows one illustrative structure for an array container:

TABLE 4

Exemplary 'array' Container

| Data Item Name | Data Item Format | Usage |
| --- | --- | --- |
| Size | 32 bit unsigned integer | Size of array container in bytes |
| Container type | 8 bit unsigned integer | e.g., "array". |
| Usage type | 8 bit unsigned integer | Data type of the value. Types may be the same as for a 'generic' or 'string' container |
| Next | 32 bit unsigned integer | Offset to the next data container packaged as part of the VR 18. When this container is the last data container added to the VR 18, this value may be zero. |
| Count | 32 bit unsigned integer | Number of data members in this array |
| Value[Count] | 32- or 64-bit unspecified format, or a string | Value data for members |

A structured data container can provide a means of packaging non-homogeneous data containers of varying types and in varying orders, including generic, string, and array container types, and other structured data containers. Structured data containers may thus be 'nested', e.g., one structured data container may be placed within (e.g., referenced by) another. The levels of nesting and/or number of data containers added to a structured data container may not exceed the size of the 'parent' VR. Table 5 shows one illustrative structure for a structured data container.

When adding a container to a structured data container, the description information of the container may be added to the structured data container's description area, and/or the descriptive fields, while the data fields of the added container may be added to the structured data container's data value area, and/or data value field. The structured data container may include tables of offsets for the added container name, description, and data. Structured data containers may thus include description information and data information, and/or may include description information only, or data information only. When the same data types and organization of data may be repeatedly communicated between first and second devices 12, 14, the structured data container can be used to transmit the description information to the destination once (or another limited number of times), while the data portion can be transmitted repeatedly.

TABLE 5

Exemplary Structured Data Container

| Data Item Name | Data Item Format | Usage |
| --- | --- | --- |
| Size | 32 bit unsigned integer | Size of this struct container in bytes |
| Container type | 8 bit unsigned integer | e.g., "struct" |
| Usage type | 8 bit unsigned integer | Contains the data type of the value. Exemplary types are the same as for a 'generic' or 'string' container |
| Next | 32 bit unsigned integer | Offset to the next data container packaged as part of the VR 18. When this container is the last data container added to the VR 18, this value may be zero |
| Member_count | 32 bit unsigned integer | The number of container members in this struct |
| Parent | 32 bit unsigned integer | Offset to the parent if this is a 'nested' struct. When this is the 'top-level' struct, this value may be zero. |

To build and interpret the VR containers described above, the first and second devices 12, 14 may use external module/function calls of API 16. The name of the module, the argument list, data type of respective arguments, and the return type for the module may be representative of an exemplary 'C'-language implementation of the API 16, though it can be understood that implementations in other programming languages compatible with the first and second devices 12, 14 may be contemplated.

VR creation can include a specifying, for example through the API, a memory allocation style, a size parameter corresponding with the memory allocation style, and a pointer to the returned VR container. In some embodiments, memory space can be allocated by choosing from among memory allocation styles, including auto, manual, and reuse. In one embodiment, the chosen memory allocation style can be used throughout the life of the VR, so as reduce errors that can result from mixing memory allocation styles. In an embodiment, bytes of space used to construct a VR can be initialized to NULL before being used.

For the exemplary embodiment, when the 'auto' memory allocation style is selected, the API 16 can allocate memory to build a VR 18, and the resultant VR 18 may be typically a 'right-sized' VR 18, since API 16 may allocate enough memory to fulfill the request. In 'auto' mode, the user can specify a size for the VR 18 to be built. If the VR 18 exceeds this size, an error can be returned and additional memory may not be automatically allocated. A 'size' of zero in auto mode can indicate no limit is specified for automatic memory allocation. For API 16, 'auto' may be the default memory allocation style.

When the 'manual' memory allocation style is selected, the user can specify an amount of memory to be allocated. The 'size' parameter can allocate the specified amount of space for the VR 18 (rounded up to the nearest block boundary). If this size is exceeded while building VR containers into this VR space, an error can be returned. In some embodiments, after such an error call, the user may use an enlarge module/function call to specify an increase of the overall size of the VR 18 by some desired and/or specified amount.

When the 'reuse' memory allocation style is selected, the user can allocate and free memory to build the VR 18 with the use of API 16 memory management calls as may be standard for the programming language being used and as provided in the device. The 'size' argument can include the size of the memory block previously allocated by the user. If this space is exceeded, an error can be returned, and the user can be responsible for determining how/whether additional space should be allocated. For the 'reuse' memory allocation style, the pointer may be a pointer to the block of memory allocated by the user for reuse. In 'reuse,' a previously allocated memory area can be reformatted and used to build the VR 18.

When it may be time to discard a VR 18 built with 'auto' or 'manual' memory allocation, the user may use a delete API module/function to free space. Parameters may include a pointer to an existing VR 18.

For one exemplary embodiment, the space and/or memory provided for data in a VR can be 34 bits (e.g., a 20-bit 'header' and one 14-bit generic 'single' container). Use of a container of that size for transmitting a data item may be inefficient in cases when data items may be smaller than the exemplary 34 bits. For example, a group of data that includes 15 status bits and two characters may employ 17 discrete 'single' containers, where one container may be provided for a data item. Considering that the 'single' container can be 14 bytes in size, a total of (17*14)+20, or 258 bytes can be employed. In such cases, the user can provide subroutines that can write/read these data items to/from just a single 32-bit container. These routines may assign a unique data range for the data items within one 32-bit data space, fitting the data into the single container with one unused bit. This method may consume a total of 14 bytes for the one 'single' container.

While a VR 18 that may include data along with a description of itself can be a reliable mechanism, it may be inefficient in cases where the same data types are sent between the same source and destination. In such cases, if the description information is known at both the source and destination, then only the 'data' portion of the VR 18 can be transmitted. In these embodiments, the data portion of a VR 18 may be separated from the description portion into an independent container. A complete VR 18 may still be sent if desired, or the 'data-only' version of the VR 18 may be sent. Sending a 'data-only' VR 18 can reduce the size of the VR 18. Additionally, once the 'data-only' VR 18 is received at its destination, the description information can be determined more readily, since a single description can apply to the containers in the 'data-only' VR 18, rather than individual containers having their own descriptions.

The ability to send a 'data-only' VR 18 can indicate that the description information for the 'data-only' VR 18 be available to and/or at the devices (12, 14, A) on the network N, either directly or indirectly (e.g., via a wired or wireless network). The devices (12, 14, A) may maintain and/or have access to descriptions of the 'data-only' VR 18's. The 'data-only' VR 18 may include a template_ID, such that the description information, or template to which the data in the 'data-only' VR 18 may be formatted, can be retrieved when a 'data-only' VR 18 may be received. It can be seen, however, that the devices (12, 14, A) may have their own listings. On large networks N, with large numbers of devices, the size of the listings can exceed the available memory space in the device.

In one embodiment, a DataType server 20 may be connected to the network N. The DataType server 20 may include one or more processors accessible to the devices (12, 14, A) via the network N. Server 20 can be responsible for providing, to a requesting device, the description 'template' for the 'data-only' VR 18. The description template can include some number of bytes, a numeric ID that can be unique, and an optional name associated with it. Predefined description templates may be loaded into server 20 at initial startup and additional templates may be created and added by the devices (12, 14, A). When a 'data-only' VR 18 is received at a device, the device can query server 20 to obtain the description template.

A template may include of a copy of a VR 18, with description information and the size and byte order. Data fields and/or areas may also be placed and sized within the template; however, the data value areas may not include valid data values. Instead, an indicator (e.g., 'is_template' flag, see Table 1) can be set to indicate that the VR 18 is a template. The data value area/field for a container can store a pointer that can point to the data in the corresponding 'data-only' version of VR 18. For example, the first 4 bytes of the data value area/field can be overloaded to include an unsigned long offset that can be used as the pointer. Other (e.g., unused) bytes of data value area/field can be initialized to NULL. When a VR 18 exists with no corresponding template, the two fields 'template_ID' and 'data_only_size' in the header container can include a value of zero. At the time a template is created for VR 18, the appropriate values can be written into these fields in both the original VR 18 and the corresponding template VR.

Once the user builds a VR 18 from one or more containers, the user may use the VR 18 as a template for future data-only transmissions. The template VR 18 can reside on a server 20 accessible on the network, or may be propagated to devices (12, 14, A) on the network that may have interest in receiving the data. API calls for operating with template and data-only VR 18's can include calls to create a template, to create a 'data-only' VR 18, and to restore a 'data-only' VR 18 to an original VR 18.

In creating a template, the input and return parameters can include a pointer to a VR 18 that the template can be created from, a value for template ID, and a pointer to the created template. Once a template exists, the original VR 18 and its template can be supplied as an input argument to create a 'data-only' VR 18 from a complete VR 18. The 'data-only' VR 18 version can be sent across the network N. At the destination, at least some of the contents of the data-only VR 18 may not be accessed directly, as the data-only VR 18 can be queried for its template ID. If a copy of a template VR 18 containing the template ID can be found at the destination or at a server 20 on the network N, the template VR 18 and data-only VR 18 can be supplied as to produce a copy of the original VR 18 at the destination. A 'data-only' VR 18 can thus be restored to a complete VR 18 based on the template ID.

As noted previously, a VR 18 may begin with a header container to which one or more containers may be added or appended. In the illustrative 'auto' mode of memory allocation, a new pointer can be provided when a container is added to a VR 18.

A bytegroup may be some number of contiguous bytes. A bytegroup can be placed into, and retrieved from a VR 18, but the VR 18 may have no internal knowledge of this group of bytes. VR 18 may treat a bytegroup the same as another data value. In this case, VR 18 may not be completely 'self-describing', i.e., VR 18 may not have a query routine to examine the internal contents of a bytegroup. Accordingly, the user can provide routines to use or otherwise operate on the group of bytes. A bytegroup may be used to implement 'nested' VR 18's. Typically VR 18 may keep 'header' information in a first container that can describe the internal construction of the VR 18 with respect to a first container. When nested, confusion may occur as more than one 'first' container can be discovered. By treating the 'nested' VR 18's as a simple bytegroup, the VR's 18 can be nested to a desired level. Unused trailing bytes in the data can be nulled.

A structured data container, or struct, can be added or appended to an existing VR 18 via the API. Once the struct exists, the contents of the struct (containers or discrete values within the containers) can be filled before other containers are added to the VR 18. When the struct being added is not be the last container appended to the VR 18, an error can be generated. As previously described, the VR 18 may be a 'chain' of containers, where the containers have offset values pointing to the 'next' container in the VR 18. A container with a NULL value for 'next' can indicate the last container in the VR 18. A struct, with its non-homogeneous members, may be constructed much the same way.

Once the struct is complete, another container can be appended to the VR 18 following the struct. When a member container is added to a struct, the struct's total size may change, whereas most other containers, when created, can be fixed in size. The above error can occur when an attempt may be made to add another container (and therefore more space) to an existing struct that may be in the middle of the VR 18, i.e., with other containers having been appended after that struct. The error can thus prevent new space from being added to a VR 18 except at the end of the VR.

The API 16 can provide calls to retrieve the data within a VR 18. The input parameter for the retrieval, or get, calls may include a pointer to the existing VR 18, another container within the VR 18, a string, or a member of a struct container. The output may correspond to the data item name in the call, as shown in Table 2. For example, the output of a call to get the allocated size of the VR 18 can be the data item in the VR 18 corresponding to the allocated size. Such get calls can include calls to retrieve allocated size, required size, memory style, container type, usage type, data type, data values, string length, bytegroup, array elements and member names, struct members and member names, index values, member types and VR type, e.g., template, 'data-only', or complete.

API utility and access calls can allow a user to obtain a pointer to the next container within a VR 18, given a pointer to the previous container. Additional calls include obtaining the number of containers in a VR 18, and/or a number of containers remaining between a specified container and the end of the VR 18. In some embodiments, containers at one level may be counted, e.g., struct containers at the current level, but containers within struct containers may not be counted.

An exemplary API can allow a user to obtain a count of elements in a VR 18. If the input pointer is to a struct within a VR 18, the user can be provided with a number of members in that struct. If the input is a pointer to an array within a VR 18, the user can be provided with a number of elements in that array. If the input is a pointer to a string container within a VR 18, the user can be provided with a size of the largest string this container can hold. Other utilities may provide a structured text of information extracted from a VR 18, including data types, sizes and current values of the containers within the VR 18 that can be used as a debugging tool.

Figure 2A:
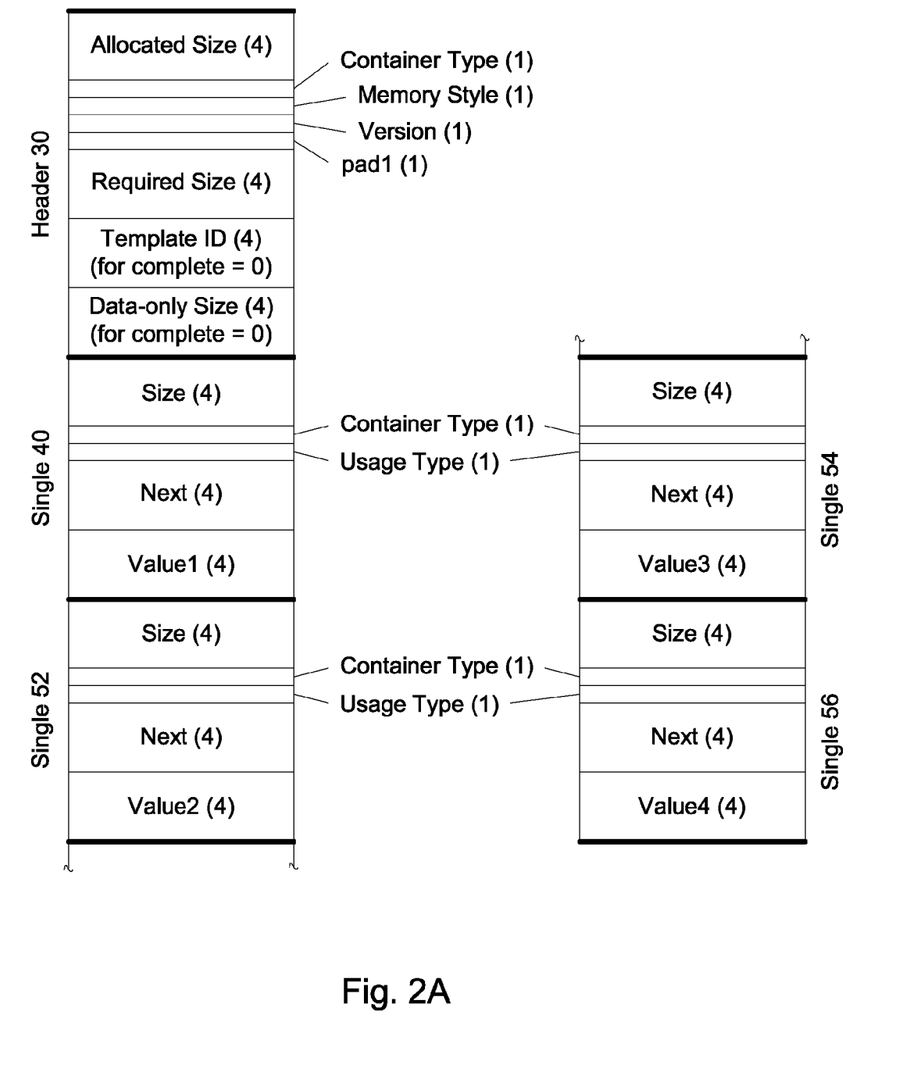
FIG. 2A is a schematic representation of the structure of a data container used to exchange data.
Figures 2B, 2C:
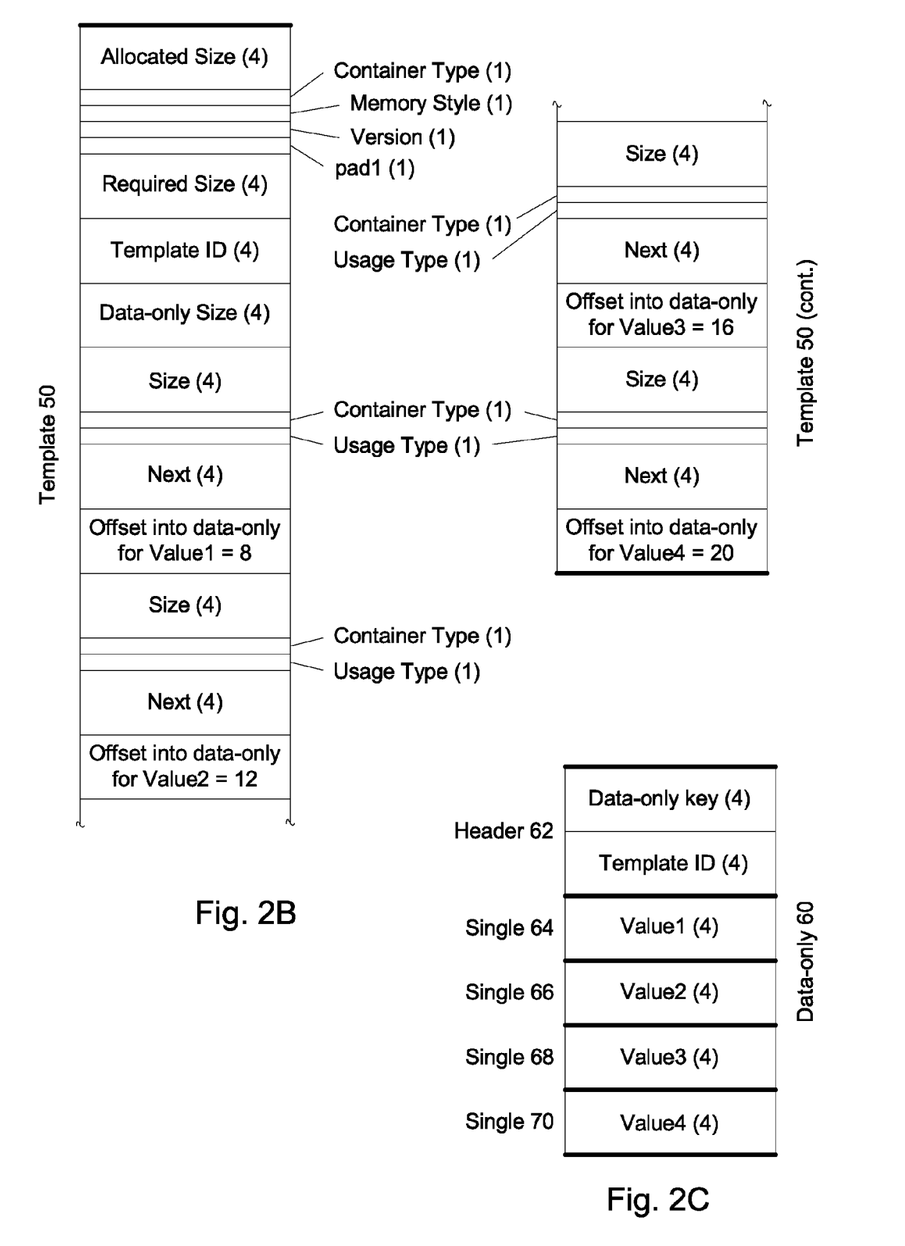
FIG. 2B is a schematic representation of the structure of a data container used as a template.
FIG. 2C is a schematic representation of the structure of a data-only container generated using the template of FIG. 2B; and, FIG. 3 is a schematic flow diagram of a method of exchanging data.

FIGS. 2A, 2B and 2C illustrate data structures for a VR 18 that includes a header container and three single containers), a template, and a data-only container, respectively. The values in parentheses in FIGS. 2A, 2B and 2C represent a number of bytes used for the referenced field. Referring now to FIG. 2A, a schematic representation of a VR 18 is shown. The illustrated header container 30 can include, for example, data items according to Table 1. The single container 40 may be appended to the header container 30 and may include the data value to be transmitted. FIG. 2A also includes a schematic representation of three additional single containers, 52, 54, 56 that can be appended to the VR 18.

FIG. 2B shows a template VR 18 that can be used as the template 50 for the data-only container 60 of FIG. 2C. The header 30 and single container 40, with the three additional single containers, 52, 54, 56 appended to the VR 18, can be used to create the template 50. It can be seen from a comparison of FIGS. 2B and 2C that the use of data-only containers can reduce the size of the container being transmitted to another device. For example, the header 30 of template 50 in FIG. 2B may have descriptive information totaling 20 bytes and the single containers 40, 52, 54, 56 may include individual descriptive information totaling 40 bytes. For the data-only container 60 of FIG. 2C, the header 62 may include the data-only key and the template ID totaling 8 bytes. Other descriptive information (shown cross-hatched in FIG. 2B) need not be transmitted. The four data values 64, 66, 68 and 70 of the data-only container 60 may correspond to the single containers 40, 52, 54 and 56, respectively, of the template 50, without the descriptive information of the single containers 40, 52, 54, and 56 (shown cross-hatched in FIG. 2B). Thus, the total size of the data-only container 60 may be 24 bytes, as compared to the 76 bytes of template 50.

Figure 3:
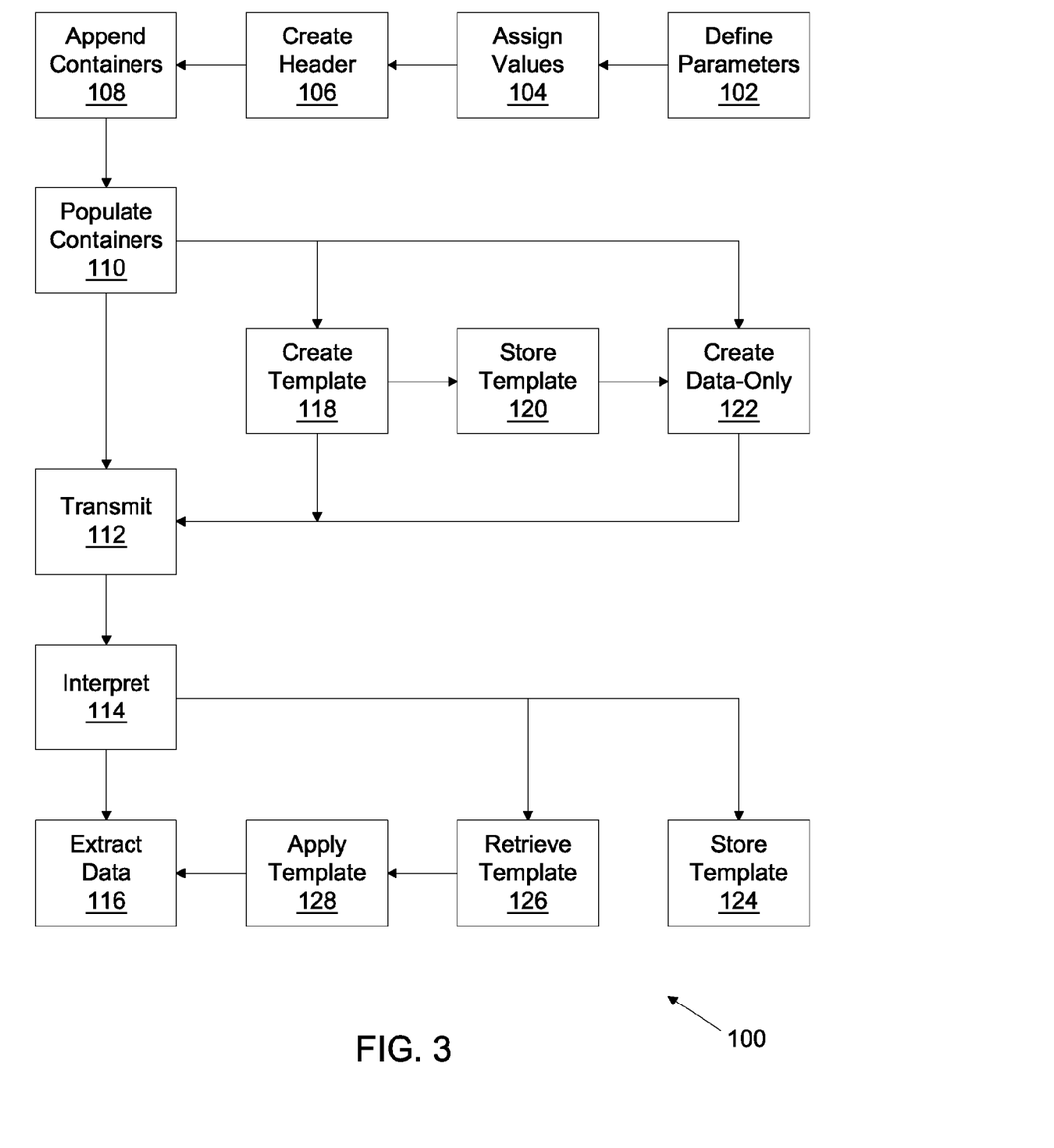

FIG. 3 shows a flow chart for a method 100 of creating and interpreting a VR 18. At 102, the parameters of the VR 18 can be defined in terms of the type of data they represent. Values may then be assigned to the defined parameters at 104. Using the parameters, a header container can be created at 106 that can include the data items as shown in Table 1. It can be noted that some of the data items may be generated by API 16 from the parameter values, as described in relation to FIGS. 2A, 2B and/or 2C.

One or more additional containers can be appended 108 to the header and populated 110 to complete the VR 18. The VR 18 may then be sent and/or transmitted from one device to another at 112. Upon receiving the VR 18, the API 16 of the receiving device may query the header container to interpret 114 the container information therein. Using the container information in the header, the data values in the appended containers can be extracted 116.

FIG. 3 also shows a method for creating templates and data-only containers and their interpretation. With the VR 18 completed at 110, the user may choose to send the VR 18 as a complete VR as in the case above. In this case, the header container can identify the VR 18 as a complete VR. If the user sends the VR as a template, which can enable future communication of data-only containers, a template can be created at 118 from the VR 18 completed at 110, and then sent to another device at 112. In this case, the header container can identify the VR 18 as a template VR. The template may also be stored (120) at the sending device, at another device and/or at a DataType Server 20, as previously described. If the user wishes to send a data-only container, a previously created template, which may or may not be the template created at 118, can be applied to the VR 18 at 122 to create the data-only VR, and the data-only VR can be sent to another device. In this case, the header container can identify the VR 18 as a data-only VR.

In interpreting a received VR at 114, the receiving device can determine whether the VR 18 is a complete, template, or data-only container. For a complete VR, the receiving device can proceed to extract the data values therein, as at 116. For a template VR, the template may be stored 124 with the associated template ID at the receiving device. For a data-only VR, the associated template can be retrieved 126 and applied (128) to the data-only VR to obtain the complete VR from which the data values can be extracted, as at 116. If the templates are stored at a device other than the receiving device, such as the server 20, the retrieval can include a call to that device for the template.

The implementation of the API 16 and VR 18 methods and systems may not be limited to particular hardware or software configurations, and may find applicability in many environments wherein data may be exchanged between devices. The methods can be implemented in one or more computer programs executing on one or more programmable computers that include a processor, such as first device 12, second device 14 and/or other devices A, a storage medium readable by the processor, one or more input devices, and one or more output devices. In some embodiments, such as that shown in FIG. 1, the methods and systems may be configured and implemented for use in a network. User control for the systems and methods may be provided through known user interfaces.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

While the method and systems have been disclosed in connection with the illustrated embodiments, various modifications and improvements thereon will become readily apparent to those skilled in the art. For example, the module/function calls, container configurations, data, memory and/or other components as may be described herein may be merely exemplary of the VR 18 and API 16, and can include one or more modules. Those with ordinary skill in the art will recognize that such functions, configurations and/or structures may be merely for illustrative purposes, and can be varied in an internally consistent manner without departing from the scope of the disclosed methods and systems.

The aforementioned changes are also merely illustrative and not exhaustive, and other changes can be implemented without affecting the ability of the API 16 and VR 18 to facilitate communication among first device 12, second device 14 and/or other devices A. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of exchanging data between a first device and at least one second device, the method comprising:

receiving at the first device a first set of data packets from the second device, each data packet having at least a first descriptive field, a second descriptive field, and data, wherein the first descriptive field indicates that the data packet is a template structure, and the second descriptive field includes a template identification (ID), for each data packet of the first set of data packets, executing by the first device an application programming interface (API) to extract the template ID from the second descriptive field of the data packet and to identify the data from the data packet as a template associated with the extracted template ID, storing concurrently the plurality of identified templates and the template ID associated with each of the plurality of identified templates for extracting data from data packets of a second set of data packets, wherein the second set of data packets is received at the first device subsequent to the first set of data packets, and receiving at the first device a third set of data packets, each data packet having at least one data value field and one usage type field having usage type data, wherein the usage type data associates the at least one data value field with a complete structure, the usage type data indicating the type of the at least one data value to be extracted from the at least one data value field via the API by the first device.

2. A method according to claim 1, further comprising:

receiving at the first device the second set of data packets, said second set of data packets comprising a data packet in which a first descriptive field indicates the data packet is a data-only structure, extracting by the first device a template ID from a second descriptive field of the data packet, querying the stored plurality of identified templates for a template associated with said template ID, retrieving the template associated with the template ID from the stored plurality of identified templates, and, based on the retrieved template and the descriptive fields in the retrieved template, extracting by the first device the data from the data packet.

3. A method according to claim 1, wherein extracting the data includes extracting based on a descriptive field associated with an architecture of the first device.

* * * * *